US008138242B2

(12) United States Patent
Reinke et al.

(10) Patent No.: US 8,138,242 B2
(45) Date of Patent: Mar. 20, 2012

(54) PROCESSING BITUMINOUS MIXTURES FOR PAVING AT REDUCED TEMPERATURES

(75) Inventors: Gerald H. Reinke, La Crosse, WI (US); Gaylon L. Baumgardner, Jackson, MS (US); Steven L. Engber, Onalaska, WI (US)

(73) Assignee: A.L.M. Holding Company, Onalaska, WI (US)

( * ) Notice: Subject to any disclaimer, the term of this patent is extended or adjusted under 35 U.S.C. 154(b) by 0 days.

(21) Appl. No.: 13/039,066

(22) Filed: Mar. 2, 2011

(65) Prior Publication Data
US 2011/0152410 A1    Jun. 23, 2011

Related U.S. Application Data

(63) Continuation of application No. 12/390,120, filed on Feb. 20, 2009, now Pat. No. 7,902,277.

(60) Provisional application No. 61/030,750, filed on Feb. 22, 2008.

(51) Int. Cl.
C08L 95/00 (2006.01)

(52) U.S. Cl. ............... 524/69; 524/59; 524/60; 524/68; 524/70; 524/71; 106/273.1; 106/277; 106/281.1

(58) Field of Classification Search ............... 106/273.1, 106/277, 281.1; 524/59, 60, 68–71
See application file for complete search history.

(56) References Cited

U.S. PATENT DOCUMENTS

| | | |
|---|---|---|
| 1,014,103 A | 1/1912 | Wallbaum |
| 1,373,661 A | 4/1921 | Johansen |
| 1,384,805 A | 7/1921 | McSwiney |
| 1,542,626 A | 6/1925 | MacKay |
| 1,640,544 A | 8/1927 | Headley |
| 1,674,523 A | 6/1928 | Sadtler |
| 1,778,760 A | 10/1930 | Hay |
| 1,815,089 A | 7/1931 | Alsdorf |
| 1,834,552 A | 12/1931 | Sadtler et al. |
| 1,842,139 A | 1/1932 | Alsdorf |
| 1,887,518 A | 11/1932 | Sadtler |
| 1,888,295 A | 11/1932 | Smith |
| 1,932,648 A | 10/1933 | Taylor |
| 1,948,881 A | 2/1934 | Kirschbaum |
| 1,988,336 A | 1/1935 | Roediger |
| 1,988,879 A | 1/1935 | Steininger |
| 2,023,068 A | 12/1935 | Flood |
| 2,025,945 A | 12/1935 | Forrest |
| 2,046,902 A | 7/1936 | Kirschbaum |
| 2,087,401 A | 7/1937 | Fair |
| 2,191,295 A | 2/1940 | Dohse |
| 2,243,519 A | 5/1941 | Barth |
| 2,283,192 A | 5/1942 | Ditto |
| 2,317,959 A | 4/1943 | Johnson et al. |
| 2,340,449 A | 2/1944 | Barwell |
| 2,374,732 A | 5/1945 | Colburn |
| 2,427,488 A | 9/1947 | Anderson et al. |
| 2,461,971 A | 2/1949 | Fischer |
| 2,550,481 A | 4/1951 | Jense |
| 2,861,787 A | 11/1958 | Csanyi |
| 2,888,418 A | 5/1959 | Albanese et al. |
| 2,901,369 A | 8/1959 | Pordes |
| 2,917,395 A | 12/1959 | Csanyi |
| 3,855,167 A | 12/1974 | Bowman |
| 3,904,428 A | 9/1975 | McConnaughay |
| 4,197,209 A | 4/1980 | Zinke et al. |
| 4,198,177 A | 4/1980 | Brett et al. |
| 4,234,346 A | 11/1980 | Latta, Jr. et al. |
| 4,244,747 A | 1/1981 | Leonard, Jr. et al. |
| 4,348,237 A | 9/1982 | Ruckel |
| 4,592,507 A | 6/1986 | Benedict |
| 4,692,350 A | 9/1987 | Clarke et al. |
| 4,724,003 A | 2/1988 | Treybig et al. |
| 4,836,857 A | 6/1989 | Hopkins |
| 5,109,041 A * | 4/1992 | Matsuno et al. ................. 524/62 |
| 5,539,029 A | 7/1996 | Burris |
| 5,622,554 A * | 4/1997 | Krogh et al. ............. 106/284.06 |
| 5,721,296 A | 2/1998 | Mizunuma et al. |
| 5,772,749 A | 6/1998 | Schilling et al. |
| 5,788,755 A | 8/1998 | Salminen |
| 5,827,360 A | 10/1998 | Salminen |
| 5,925,233 A | 7/1999 | Miller et al. |
| 6,074,469 A * | 6/2000 | Collins et al. ............... 106/273.1 |
| 6,136,898 A * | 10/2000 | Loza et al. ...................... 524/69 |
| 6,197,837 B1 | 3/2001 | Hill et al. |
| 6,451,885 B1 | 9/2002 | Dresin et al. |
| 6,559,206 B1 | 5/2003 | Durand et al. |
| 6,576,050 B1 | 6/2003 | Samanos |
| 6,588,974 B2 * | 7/2003 | Hildebrand et al. ............ 404/31 |
| 6,793,964 B2 | 9/2004 | Hoad |
| 6,846,354 B2 | 1/2005 | Larsen et al. |
| 6,913,416 B2 | 7/2005 | Hildebrand et al. |
| 7,041,165 B2 | 5/2006 | Malot |
| 7,114,843 B2 | 10/2006 | Romier et al. |
| 7,114,875 B2 | 10/2006 | Romier et al. |
| 7,160,943 B2 | 1/2007 | Burris et al. |
| 7,297,204 B2 | 11/2007 | Crews et al. |
| 7,309,390 B2 | 12/2007 | Falkiewicz |
| 7,815,725 B2 | 10/2010 | Reinke et al. |

(Continued)

FOREIGN PATENT DOCUMENTS

AU    433003    2/1973

(Continued)

OTHER PUBLICATIONS

AKZO International Highway Chemical Newsletter, Chemical Division, Spring 1989, pp. 1-9.

(Continued)

*Primary Examiner* — Peter Szekely
(74) *Attorney, Agent, or Firm* — Kagan Binder, PLLC

(57) ABSTRACT

Bituminous paving mixtures containing lubricating agents or additives may be prepared at hot mix temperatures and cooled, paved and compacted at temperatures 10-55 Celsius degrees lower than the hot mix temperatures. The increased temperature range between the hot mix temperatures and the paving and compacting temperatures is facilitated by the improved compacting properties of the paving mixture when it includes the lubricating agents or additives.

19 Claims, 1 Drawing Sheet

U.S. PATENT DOCUMENTS

| | | | |
|---|---|---|---|
| 7,968,627 | B2 | 6/2011 | Reinke et al. |
| 7,981,466 | B2 | 7/2011 | Reinke et al. |
| 7,981,952 | B2 | 7/2011 | Reinke et al. |
| 2002/0170464 | A1 | 11/2002 | Larsen et al. |
| 2004/0014845 | A1 | 1/2004 | Takamura et al. |
| 2004/0223808 | A1 | 11/2004 | Romier et al. |
| 2004/0244646 | A1 | 12/2004 | Larsen et al. |
| 2005/0018530 | A1 | 1/2005 | Romier et al. |
| 2005/0284333 | A1 | 12/2005 | Falkiewicz |
| 2006/0086288 | A1 | 4/2006 | Bourrel et al. |
| 2006/0169173 | A1 | 8/2006 | Dupuis et al. |
| 2006/0236614 | A1 | 10/2006 | Antoine et al. |
| 2006/0240185 | A1 | 10/2006 | Antoine et al. |
| 2006/0288907 | A1 | 12/2006 | Fox |
| 2007/0039520 | A1* | 2/2007 | Crews et al. .............. 106/316 |
| 2007/0060676 | A1* | 3/2007 | Reinke ...................... 524/59 |
| 2007/0082983 | A1 | 4/2007 | Crews et al. |
| 2007/0191514 | A1* | 8/2007 | Reinke et al. ............. 524/59 |
| 2009/0088499 | A1* | 4/2009 | Barreto et al. ............. 524/68 |
| 2011/0017096 | A1 | 1/2011 | Reinke et al. |
| 2011/0020537 | A1 | 1/2011 | Reinke et al. |
| 2011/0021673 | A1 | 1/2011 | Reinke et al. |
| 2011/0152410 | A1 | 6/2011 | Reinke et al. |
| 2011/0214589 | A1 | 9/2011 | Reinke et al. |
| 2011/0243661 | A1 | 10/2011 | Baumgardner et al. |

FOREIGN PATENT DOCUMENTS

| | | | |
|---|---|---|---|
| AU | 2006231250 | | 10/2006 |
| EP | 0568021 | | 11/1993 |
| EP | 0994923 | | 4/2000 |
| EP | 1398351 | | 3/2004 |
| EP | 1263885 | | 6/2004 |
| EP | 1469038 | | 10/2004 |
| EP | 1 398 351 | * | 6/2007 |
| GB | 429548 | | 5/1935 |
| GB | 783015 | | 9/1957 |
| GB | 2234512 | | 8/1989 |
| JP | 2002-332606 | * | 11/2002 |
| JP | 2006/132131 | | 5/2006 |
| WO | 95/22661 | | 8/1995 |
| WO | 01/16233 | | 3/2001 |
| WO | 01/62852 | | 8/2001 |
| WO | 02/16499 | | 2/2002 |
| WO | 02/103116 | | 12/2002 |
| WO | 2005/081775 | | 9/2005 |
| WO | WO 2006/106222 | * | 10/2006 |
| WO | WO 2007/032915 | * | 3/2007 |
| WO | 2007/112335 | | 10/2007 |
| WO | 2008/148974 | | 12/2008 |
| WO | 2009/033060 | | 3/2009 |

OTHER PUBLICATIONS

Anderson, David A., et al, "The Effect of Antistrip Additives on the Properties of Asphalt Cement," Asphalt Paving Technology 1982, Proceedings Association of Asphalt Paving Technologists Technical Sessions, Kansas City, Missouri, vol. 51, Feb. 22, 23 & 24, 1982, pp. 298-317.

Barreto, "Warm Asphalt Mixes Containing Dispersed Water," ARKEMA-CECA France, Abstract No. 658, 2006, 7 pp.

Bonola et al., "Technologies for the Production of Asphalt Mixes with Low Temperature Processes," World Road Association Italian National Committee, Dec. 2005, 31 pp.

Caillot et al., "Warm Mix Asphalts and Cold Recycling for Controlled Use of Effective Road Techniques Reducing Nuisances," Technical Department for Transport, Roads, and Bridges, Engineering for Road Safety, Ministry for Transport, Infrastructure, Tourism and the Sea, France, 12 pp.

Ceca Arkema Group, "Green Road Formulation-Warm Asphalt Mix. 2007 Innovation: helping to lower our planet's temperature," www.siliporite.com, accessed Nov. 21, 2007, 1 pg.

Cervarich, "Cooling Down the Mix" NAPA Explores New "Warm Mix Asphalt" Technologies Developed in Europe, Hot Mix Asphalt Technology, Mar./Apr. 2003, pp. 13-16.

Choi, Y., Warm Asphalt Review, Austroads Report, Arrb Research, RETT220B, Publication No. AP-T91/07, Nov. 2007.

Damm, K., Abraham, J., Butz; T., Hildebrand, G., Riebesehl, G., "Asphalt Flow Improvers as Intelligent Fillers for Hot Asphalts—A New Chapter in Asphalt Technology," Journal of Applied Asphalt Binder, vol. 2, Issue 1, p. 36-70, Apr. 2002.

Declaration of Patrick Lavin, Jun. 6, 2011; explains 26 years of experience with essentially water-free, non-foaming binders along with the use of additives and the effects of temperature on paving.

Diefenderfer et al., "Research Report: Installation of Warm Mix Asphalt Projects in Virginia," Virginia Transportation Research Council, Apr. 2007, 34 pp.

Giannattasio, Allessandro, "To improve the quality of road bitumen," Reprint from the Italian Building and Construction Issue No. 69/1998-19$^{th}$ Year; pp. 2, 3, 7.

Gibson, Nelson, Modified Asphalt Research Activities at FHWA's Turner-Fairbank Highway Research Center (TFHRC), Pavement Materials and Construction Team, AMAP Conference, Feb. 2005, Orlando, FL, 18 pages.

Goh et al., "Laboratory Evaluation and Pavement Design for Warm Mix Asphalt," Proceedings of the 2007 Mid-Continent Transportation Research Symposium, Ames, IA, Aug. 2007, 11 pp.

Gudimettla, Jagan M., et al., "Workability of Hot Mix Asphalt," National Center for Asphalt Technology, Apr. 2003, 66 pages.

Hurley et al., "Evaluation of Aspha-Min™ Zeolite for Use in Warm Mix Asphalt," National Center for Asphalt Technology Report, Auburn University, 30 pp., Jun. 2005.

Hurley et al., "Evaluation of Evotherm™ for Use in Warm Mix Asphalt," National Center for Asphalt Technology Report, Auburn University, Jun. 2006, 49 pp.

Hurley et al., "Evaluation of Potential Processes for Use in Warm Mix Asphalt," National Center for Asphalt Technology, 2006, 46 pp.

Hurley, Graham C., et al., "Evaluation of Sasobit™ for Use in Warm Mix Asphalt," National Center for Asphalt Technology Report, Auburn University, Jun. 2005, 32 pp.

International Search Report issued in PCT/US/2006/33907, mailed Sep. 24, 2007, 4 pages.

International Search Report and Written Opinion issued in PCT/US2008/075452, mailed Feb. 13, 2009, 13 pages.

International Search Report for PCT/US2009/034742, mailed May 26, 2009, 10 pages.

International Search Report and Written Opinion issued in PCT/US2009/052830, mailed Sep. 16, 2010, 9 pages.

Iterchimica Company; "Abstract of the 2005 production categories and applications," Iterchimica Brochure, p. 2 (2005).

James, A.D., et al., "Adhesion Agents for Use in Hot Mixes and Cut-Back Bituments," presented at the 3$^{rd}$ IRF Middle East Regional Meeting, Riyadh, Saudi Arabia, 1988, 10 pages.

Jenkins et al., "Half-Warm Foamed Bitumen Treatment, A New Process," 7$^{th}$ Conference on Asphalt Pavements for Southern Africa, 1999, 7 pp.

Jones, "Warm Mix Asphalt Pavements: Technology of the Future?" Asphalt, Fall 2004, pp. 8-11.

Koenders et al., "Innovative process in asphalt production and application to obtain lower operating temperatures," 2$^{nd}$ Eurasphalt & Eurobitume Congress Barcelona 2000, Book II, pp. 830-840.

Kristjansdottir, Olof, "Warm Mix Asphalt for Cold Weather Paving," a thesis, University of Washington, 2006, 127 pp.

LaPointe, Dennis G., e-mail correspondence, May 2011, 4 pages.

Lavin, Patrick, "Asphalt Pavements: A practical guide to design, production and maintenance for engineers and architects," 2003, pp. 347.

Logaraj, Sundaram, et al., "Surface-active bitumen additive for warm mix asphalt with adhesion promoting properties," 2009, 12 pages.

"Low Energy Asphalt (LEA) with the Performance of Hot-Mix Asphalt (HMA)", European Roads Review, Special Issue, BGRA, Feb. 2004 (pp. 1-11).

Malick, R.BN, Bradley, J.E., Bradbury, R.L., An Evaluation of Heated Reclaimed Asphalt Pavement (RAP) Material and Wax Modified Asphalt for Use in Recycled Hot Mix Asphalt (HMA),' 2007.

Naidoo, P., "Fischer-Tropsch Hard Wax Chemistry in Warm Mix Asphalt Applications," Petersen Asphalt Research Conference, Abstract and Presentation Slides, Jun. 20-22, 2005.

Naidoo, P., Sasobit in Warm Mix Asphalt Applications 9 Years of Global Successes, World Asphalt Conference Presentation Slides, Mar. 14, 2006.

Paez, R., "Production of Modifier Asphalt Additives in Equator," 2005 International Symposium on Pavement Recycling, San Paulo, Brazil, Mar. 14-16, 2005, pp. 1-11.

Petersen, J. Claine, "Relationships Between Asphalt Chemical Composition and Performance-Related Properties," ISSA Meeting, Phoenix Arizona, Jan. 23-27, 1982, 10th page.

Progress Report 2006, The German Bitumen Forum, Jun. 2006, 36 pp.

Schwartz, Anthony M., et al., Surface Active Agents and Detergents, vol. 2, 1977, pp. 673-677.

Tarrer, A.R., et al., "The Effect of the Physical and Chemical Characteristics of the Aggregate on Bonding," Strategic Highway Research Program, Feb. 1991, 31 pages.

* cited by examiner

PROCESSING BITUMINOUS MIXTURES FOR PAVING AT REDUCED TEMPERATURES

CROSS-REFERENCES TO RELATED APPLICATIONS

This application is a continuation of U.S. application Ser. No. 12/390,120, filed Feb. 20, 2009, which claims the benefit under 35 U.S.C. §119(e) to U.S. Provisional Patent Application No. 61/030,750, filed Feb. 22, 2008, all of which are incorporated herein by reference in their entirety.

BACKGROUND

Paving materials are typically prepared in an asphalt plant at elevated temperatures before being transported to a construction site. The chosen paving material mixing temperature may depend on a number of factors including the chosen binder, the distance or transportation time to the construction site, and ambient temperature conditions en route and at the site. For example, some paving materials are prepared at 130° C. or higher and, during transportation to the construction site, may cool by about 5-8° C. However, in some instances the paving materials must be transported for relatively long times (e.g., more than two hours), for relatively long distances (e.g., more than 300 Km), or be exposed to very cool outdoor temperatures (e.g., less than 5° C.). This may lead to excessive cooling of the paving materials, which in turn may cause issues during paving or compacting. In some such instances, the temperatures at which the paving materials are prepared may be increased to compensate for such cooling. However, increased preparation temperatures may cause other issues including one or more of increased evaporation of volatiles, degradation of some of the components of the paving materials, and excessive energy consumption.

SUMMARY

The present application provides processing conditions for bituminous paving mixtures containing lubricating agents or additives in which the paving mixtures may be prepared at hot mix temperatures and then when cooled can be paved and compacted at temperatures 10-55 Celsius degrees lower (or more than 55 Celsius degrees lower) than the hot mix preparation temperatures. The increased range between the hot mix temperatures and the paving and compacting temperatures is provided, in part, by the improved compacting properties provided by these lubricating agents or additives.

The present invention provides processing an asphalt binder and bituminous paving mixture in order to allow, for example, increased transportation times, longer working times, or a greater range of application temperatures. These properties provide improvements in production and paving processes compared to other hot and warm mix processes.

DETAILED DESCRIPTION

Figure 1:
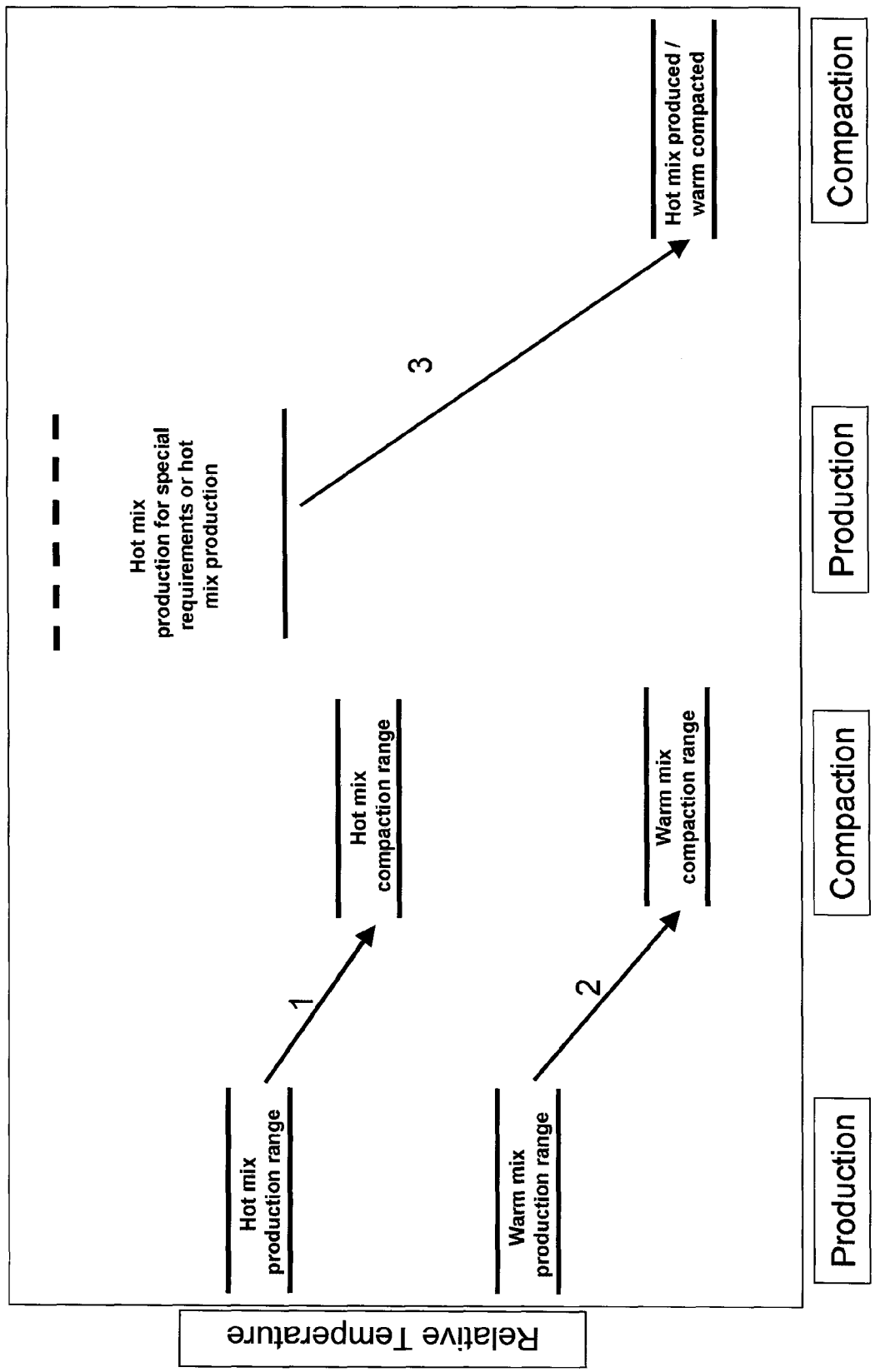
FIG. 1 illustrates an increase in the difference between production and compaction temperatures for a bituminous paving mixture prepared according to the process of the present invention compared to bituminous paving mixtures prepared at hot mix or warm mix temperatures.

It may be desirable for a variety of reasons to prepare bituminous paving materials at, near, or in excess of temperatures used for hot mix asphalt but to pave and compact this paving mixture at least about 10 Celsius degrees, between about 17-45 Celsius degrees, between about 10-55 Celsius degrees, or more than 55 Celsius degrees, below the temperatures at which the paving material is prepared. For example, the bituminous paving mixture may be compacted at temperatures 17, 22, 28, 33, 39, 44 or 50 Celsius degrees below the temperature at which the paving mixture is prepared. Further, the bituminous paving mixture may be compacted at temperatures at least about 10 Celsius degrees, at least about 15 Celsius degrees, at least about 20 Celsius degrees, at least about 30 Celsius degrees, at least about 40 Celsius degrees, or at least about 45 Celsius degrees below the temperature at which the paving mixture is prepared. According to the processes of this invention, hot mix temperatures, for example, may be greater than about 130° C., greater than about 135° C., greater than about 140° C., greater than about 150° C., greater than 160° C., greater than 170° C., or greater than about 175° C. In other embodiments, hot mix preparation temperatures may be between about 120° C. and about 175° C., between about 130° C. and about 170° C., between about 135° C. and 170° C., between about 140° C. and 170° C., or between about 150° C. and 160° C. Paving and compaction temperatures, for example, may be less than about 160° C., less than about 145° C., less than about 135° C., less than about 130° C., less than about 125° C., less than about 120° C., or less than about 100° C. In some examples, the paving and compaction temperatures may be in a temperature range of about 60° C. to about 160° C., between about 80° C. and about 150° C., between about 100° C. and about 135° C., or between about 100° C. and about 125° C.

Utilization of the process and additives provided in this application enables the production and paving of bituminous paving mixtures under a wide range of conditions. After being compacted at warm temperatures, the bituminous paving mixtures have acceptable field densities for a compacted bituminous material. Exemplary field densities include, but are not limited to less than 10% in place air voids, less than 8% in place air voids and less than 5% in place air voids (when measured according to accepted practices in the paving industry).

Warm mix asphalt compositions are used to produce bituminous paving mixtures at temperatures below those used to produce hot mix asphalt compositions. In addition to producing a bituminous paving mixture at reduced temperatures, warm mix compositions also allow paving and compacting these bituminous paving mixtures at temperatures below those used to pave and compact hot mix asphalt. These reduced temperatures may be 33-45 Celsius degrees or more below the temperatures used to produce and pave hot mix asphalt compositions.

U.S. application Ser. No. 11/871,782 reports functionally dry asphalt binder compositions, polymer modified asphalt binder compositions and polymer/acid-modified asphalt binder compositions that have been modified with lubricating non-aqueous surfactants, non-surfactant additives, acids or combinations thereof (collectively, lubricating agents or additives). These lubricating agents or additives provide asphalt binder compositions which can be adequately mixed with aggregate at temperatures 17-28 Celsius degrees lower, even more than 28 Celsius degrees lower, or as much as 55 Celsius degrees lower than a substantially similar asphalt binder or asphalt cement that does not contain these lubricating additives. In addition, these asphalt/aggregate mixtures can be compacted at temperatures 17-28 Celsius degrees lower, even temperatures more than 28 Celsius degrees lower, or as much as 55 Celsius degrees lower than a substantially similar asphalt/aggregate mixture that does not contain these lubricating additives. The entire disclosure of U.S. application Ser. No. 11/871,782, filed Oct. 12, 2007 is incorporated by reference in this application.

Some embodiments of the present invention include a method or process that uses a bituminous paving material containing lubricating agents or additives that may be prepared at temperatures up to, or in excess of, hot mix asphalt production temperatures, and that may be cooled and subsequently paved and compacted at least about 10 Celsius degrees, between about 17-45 Celsius degrees, between about 10-55 Celsius degrees, or more than 55 Celsius degrees, below the hot mix asphalt production temperatures. According to the process of this invention, an asphalt binder, lubricating additive and aggregate are mixed at temperatures 10-55 Celsius degrees, or greater, above the paving and compacting temperatures of the resulting bituminous paving material.

As illustrated in FIG. 1, the process of the present invention provides an increase in the temperature difference between production and compaction temperatures for bituminous mixtures compared to bituminous mixtures prepared and compacted using hot mix or warm mix processes. When a bituminous mixture is prepared and compacted using a hot mix process, the difference between the production and compaction temperatures is schematically illustrated by ARROW 1. Similarly, when a bituminous mixtures is prepared and compacted using a warm mix process the difference between the production and compaction temperatures is illustrated by ARROW 2. In contrast to the hot and warm mix processes, the process of the present invention provides for preparing a bituminous mixture at a hot mix temperature and then compacting the mixture at a lower or reduced temperature similar to compaction temperatures used for bituminous mixtures prepared by warm mix processes. The increased difference in the production and compaction temperatures of the present process is illustrated by ARROW 3. The increased or expanded difference between the production temperature and compaction temperature permits, for example, one or more of increased transportation times, longer working times and a greater range of application temperatures.

Water employed in some other warm mix technologies may not be essential to the successful production of bituminous material containing the lubricating agents or additives. The production of hot mix asphalt to produce a bituminous mixture at or near hot mix asphalt temperatures, with or without any additives, results in the removal of water as a component in these hot mix compositions. Bituminous mixtures containing a lubricating additive, with or without added water, and bituminous mixtures produced by injecting water into an asphalt binder containing a lubricating additive, are both intended to be within the scope of the present invention.

Warm paving and compaction processes may be used in a variety of different scenarios. One scenario is using a "warm mix asphalt" where the production and paving of a bituminous mix is carried out at temperatures significantly lower than the temperatures used to produce and pave a hot mix asphalt using the same binder (or suitable asphalt cement). In this scenario, "warm" refers to production and paving temperatures that may be 33-45 Celsius degrees, or more, below the hot mix and hot paved temperatures for a similar binder. There are, however, circumstances where it is desirable or even necessary to produce a bituminous paving mix at, near or in excess of hot mix temperatures with the intention of paving and compacting this bituminous paving mix at reduced temperatures that are associated with warm mix conditions.

Some reasons for producing a bituminous paving mixture at, near, or in excess of hot mix production temperatures but paving and compacting this mixture at 10-55 Celsius degrees, or more than 55 Celsius degrees, below the temperatures at which the mix is produced include, but are not limited to, the following scenarios:

1) In some geographical regions the cost to move and set up a bituminous mix facility could be cost prohibitive for a small paving project and therefore it would be more cost effective to produce the bituminous mixture at a remote location at an elevated temperature and haul the mix to the paving project site thus resulting in the need to be able to pave and compact the mix at reduced temperatures.

2) In some geographical regions the aggregate resources might not exist or might not be developed to the extent that it is financially viable to produce the bituminous mixture at or near the location of the paving project, thus there could be a need to produce the bituminous mixture at a location with the requisite aggregate resources at an elevated temperature but still be able to compact the mixture at a reduced temperature after the bituminous mix has been hauled to paving project.

3) It may be desirable for other reasons to haul the bituminous mixture a long distance (resulting in a substantial reduction in the temperature of the mixture) without having to excessively heat the bituminous mix during production at the mix facility while still being able to pave this mixture upon arrival at a project site. This avoids potential quality problems that may be associated with having to excessively heat a bituminous mix.

4) Still another reason is the desire to provide bituminous mix to a contractor to perform minor repair patches during the course of a day without returning to the bituminous mix facility to obtain fresh paving mixture at an elevated temperature.

5) During early and late season bituminous mix placement (especially in cooler climates) it may be desirable to produce bituminous mix at a temperature in excess of the temperature employed to produce a warm mix for the mix in question, thus enabling the bituminous mix so produced to be compacted at a temperature 10-55 Celsius degrees, or more than 55 Celsius degrees, below the temperature at which the mix is produced.

For these different scenarios or conditions, and others, the ability to compact the bituminous paving mixture at reduced temperatures regardless of the production temperature is an improvement over existing processes.

Depending on the needs of the individual bituminous mix producer these reduced mix production temperatures are not essential and may not be desired even though the ability to pave and compact this mix at substantially reduced temperatures may be desired and perhaps essential. Utilization of the production process reported in this application enables production of bituminous paving mixture at any reasonable temperature, but allows the contractor to place and pave the mixture at reduced temperatures.

Surfactants (in both aqueous or non-aqueous form) and waxes are two general classes of lubricating additives that may, when incorporated into an asphalt binder at levels as low as 0.1 wt %, provide sufficient lubrication of the asphalt binder so that aggregate may be adequately coated and then paved and compacted at temperatures 10-55 Celsius degrees, or more than 55 Celsius degrees, lower than the temperatures normally needed for compaction of similar bituminous mixtures that do not include the lubricating agent or additive.

Non-aqueous surfactants have been incorporated into asphalt binder as additives to provide improved moisture resistance, however, their value and function as a lubricating agent in warm mix asphalt and specifically in a functionally dry or water free warm mix composition have not been appreciated. (The term "functionally dry", or "essentially water free", as used herein in connection with compositions, aggregates or mixtures is used to describe reduced water content compositions, aggregates or mixtures, particularly those in the "hot mix" regime, for example as described above.) Exemplary surfactants include naturally occurring compounds and more commonly synthesized chemical compounds from three categories of surfactants: detergents, wetting agents and emulsifiers. Surfactants may be specifically grouped into four classifications: i) anionic surfactants including, but not limited to, fatty acids (e.g., saturated and unsaturated fatty acids), fatty acid pitch (e.g., stearic acid pitch), and fatty acid derivatives (e.g., fatty acid esters and fatty acid sulfonates), and organo phosphates (e.g., alkyl phosphates); ii) cationic surfactants including, but not limited to, alkyl amines, alkyl quaternary ammonium salts, heterocyclic quaternary ammonium salts, amido amines, and non-nitrogenous sulfur or phosphorous derivatives; iii) amphoteric surfactants including, but not limited to, amino acids, amino acid derivatives, betain derivatives (e.g., alkylbetains and alkylaminobetains), imidazolines, imidazoline derivatives; and iv) nonionic surfactants including, but not limited to, fatty acid esters (e.g., SPAN or TWEEN surfactants), surfactants with ether links (e.g., alkylphenolpolyoxeythylenes and polyoxyethylenated alcohols), surfactants with amide groups (e.g., alkylamides, mono and diethanolamides and their derivatives), alkylenated oxide copolymers and polyoxyethyleneated mercaptans. One exemplary surfactant is an ethoxylated tallow diamine surfactant.

In one exemplary embodiment of the invention, the lubricating surfactant may be used in an amount in the range of about 0.1-1.0 wt % based on the weight of the asphalt binder. Other amounts that are within the scope of this invention include the ranges of, for example, about 0.1-0.5 wt %, 0.1-0.4 wt %, and 0.1-0.3 wt %.

Non-surfactant additives based on wax chemistry have been incorporated into an asphalt binder to produce warm mix paving mixtures. Wax additives such as Sasobit™ wax (Sasol North America Inc.) and montan wax (Romanta, Amsdorf, Germany or Strohmeyer and Arpe, NJ) used for this application have only a minor effect on reducing the viscosity of the asphalt-wax blend, but such additives, even at usage levels well below those generally employed, provide a noticeable and beneficial lubricating effect on the asphalt-wax combination. Non-surfactant additives based on wax chemistry may include paraffin and non-paraffin waxes. Paraffin waxes include, but are not limited to, petroleum, petroleum-derived and refined waxes (slack wax and refined macrocrystalline wax) while non-paraffin waxes include, but are not limited to, natural waxes (e.g., animal, vegetable, and mineral waxes such as beeswax and carnuaba wax), modified natural waxes (e.g., brown coal derivatives such as montan wax and mineral oil derivatives), partial synthetic waxes (e.g., acid waxes, ester waxes, amide waxes, alcohol waxes and oxidized polyethylene waxes), and full synthetic waxes (e.g., Fischer-Tropsch waxes and polyethylene waxes).

In one exemplary embodiment of the invention, the lubricating wax may be used in amount of about less than 1.5 wt % of the weight of the asphalt binder. In other exemplary embodiments of the invention, the lubricating wax may be used in an amount in the range of about 0.1-1.0 wt %. Other amounts are within the scope of this invention and include ranges of, for example, about 0.1-0.5 wt %, 0.1-0.4 wt %, and 0.1-0.3 wt %.

Other non-surfactant additives such as viscosity modifiers (VMS), dispersant viscosity modifiers (DVMS), and additives containing viscosity modifiers or dispersant viscosity modifiers as well as extrusion processing aids, molding processing aids, polyolefins, or sulfur, may provide lubricating characteristics to petroleum products and may also be used as non-surfactant lubricating additives. Such additives include, but are not limited to, VMS and DVMS used in engine lubricating oils (e.g., polyisobutylenes, olefin copolymers, hydrogenated styrene-diene copolymers, styrene maleate copolymers, polymethacrylates, olefin-graft PMA polymers and hydrogenated polyisoprene star polymers) and products containing VMS and DVMS such as the residual bottoms from refined recycled engine lubricating oils; extrusion processing aids; molding processing aids (e.g., high trans content polyoctenamer reactive polymers); polyolefins, ethylene vinyl acetates; acrylic polymers; silicones; and elemental sulfur or sulfur derivatives (e.g., sulfur impurities used in fuels to provide lubrication properties). These lubricating additives may, for example, be used in an amount in the range of about 0.1-1.0 wt %, about 0.1-0.5 wt %, about 0.1-0.4 wt %, or 0.1-0.3 wt %.

Phosphoric acids or their derivates are also another class of additives that can, when incorporated into an asphalt binder at levels as low as about 0.2-1.0 wt %, provide sufficient lubrication of a bituminous mixture so that it may be adequately compacted at temperatures 10-55° C., or more than 55° C., below the temperatures normally needed to compact a similar bituminous mixture without the use of this class of phosphoric acid additives. Exemplary lubricating phosphoric acid grades include polyphosphoric acid (PPA), superphosphoric acid (SPA), and other grades of phosphoric acid. In exemplary embodiments of the invention, the lubricating phosphoric acid derivative may be used in an amount of about 0.1-1.5 wt % or about 0.2-1.0 wt % based on the weight of the asphalt binder. Other amounts are within the scope of this invention and include ranges of, for example, about 0.1-0.5 wt %, 0.1-0.4 wt %, and 0.1-0.3 wt %.

Some embodiments of the present process may use paving mixtures mixed with aggregate and optional reclaimed asphalt pavement (RAP) at a hot mix temperature (where this hot mix temperature may be a function of the original or starting PG asphalt grade, viscosity or penetration of the binder) and then the resultant mixture may be compacted at a temperature of 10-55 Celsius degrees, or more than this amount, lower then the hot mix temperature. The amounts of RAP that may be included in the paving mixtures may be 1-98 wt % of the mix, 10-60 wt % of the mix, or up to about 30 wt % of the mix.

Still another embodiment of the present process may use polymer modified asphalt binder compositions comprising a lubricating additive. Exemplary polymer modified asphalt binders may include modifiers such as, but not limited to, synthetic polymers, reclaimed rubber, and reclaimed polymers (e.g., reclaimed polyolefins and polyesters). Other examples of polymer modified asphalt binder compositions are provided in U.S. Patent Application No. 61/101,942, filed Oct. 1, 2008, entitled "Stable Emulsions for Producing Polymer Modified Asphalt," which is incorporated herein by reference in its entirety.

Still another embodiment of the present process may use fiber modified asphalt binder compositions comprising a lubricating additive. Exemplary fiber modified asphalt binders may include fibers such as, but not limited to, organic and inorganic fibers (e.g., polyolefin, cellulosic and mineral fibers).

The present invention also includes forming a paved surface using the paving mixtures made by the process described herein. In this embodiment, a paving mix may be made in the hot mix temperature ranges described herein. The mixing may occur at or away from the paving site, and the mixture may cool as it is being hauled to the site and supplied to a paving machine. The paving mixture is then applied by the paving machine to a prepared surface after which it is usually roller compacted by additional equipment while still at an elevated temperature, for example at any of the paving and compacting temperature ranges provided herein. The compacted aggregate and asphalt mixture eventually stiffens upon cooling. Because of the large mass of material in paving a roadway or commercial parking lot, the cost of the thermal energy to achieve suitable mixing and paving is reduced because of the reduction in the temperature necessary for proper paving.

The present inventive process also includes the process of adding a lubricating substance into a heated asphalt binder; combining the lubricated asphalt binder composition with a suitable aggregate that may optionally contain varying amounts of RAP; at any of the hot mix temperature ranges provided herein, mixing to coat the aggregate and optional RAP with the lubricated asphalt binder composition to form a paving material; transferring the paving material to a paving machine; applying the paving material with the paving machine at a warm mix paving temperature to a prepared surface; and then compacting the applied paving material to form a paved surface at any of the paving and compacting temperature ranges provided herein.

Example 1

The inclusion of varying amounts of Reclaimed Asphalt Pavement (RAP) as a component in bituminous mix is a desired option to the bituminous paving industry. Varying amounts of RAP levels, including but not limited to 1-98 wt % of the mix, 10-60 wt % of the mix, or up to about 30 wt % of the mix, have been used successfully with some warm mix processes. In this example, one bituminous mix was produced with RAP at a hot mix temperature and another bituminous mix was produced with RAP at a warm mix temperature. Both of these mixes were then compacted at a reduced temperature relative to a conventional hot mix compaction temperature.

A paving mix suitable for a 1 million ESAL pavement utilizing 20% RAP was used in this example. The target virgin binder content for this paving mix was 4.7% by weight of mix. A PG 58-28 binder containing 0.5% Akzo Nobel E-6 ethoxylated tallow diamine by weight of binder was used as the virgin binder for two mixes. The two mixes were evaluated as detailed below:

TABLE 1

Comparison Of Hot Mix And Warm Mix Production Using 20% Rap With Both Mixes Compacted At Warm Temperature

| Conditions | Mix 1-Hot mix, warm compaction | Mix 2-Warm mix, warm compaction |
| --- | --- | --- |
| Mixing temperature | 148° C. (300° F.) | 110° C. (230° F.) |
| Conditioning time total | 2 hrs | 2 hrs |
| Conditioning temp | | 104° C. (220° F.) |
| Conditioning temp 1 | 30 minutes @ 135° C. (275° F.) | |
| Conditioning temp 2 | 30 minutes @ 121° C. (250° F.) | |

TABLE 1-continued

Comparison Of Hot Mix And Warm Mix Production Using 20% Rap With Both Mixes Compacted At Warm Temperature

| Conditions | Mix 1-Hot mix, warm compaction | Mix 2-Warm mix, warm compaction |
| --- | --- | --- |
| Conditioning temp 3 | 30 minutes @ 110° C. (230° F.) | |
| Conditioning temp 4 | 30 minutes @ 104° C. (220° F.) | |
| Compaction temp | 104° C. (220° F.) | 104° C. (220° F.) |
| Air voids @ design gyrations | 3.5% | 3.4% |

The hot mixed, warm compacted mix was sequentially cooled to the warm compaction temperature in order to simulate a paving mix that would be produced at a hot mix temperature and then hauled to a paving project site so that the mix temperature gradually dropped over a period of time to the warm compaction temperature. This data shows no detriment of having produced a paving mix containing selected amounts of RAP, such as but not limited to 20 wt %, at 148° C. and having maintained the mix at elevated temperatures for a period of time prior to cooling to the final compaction temperature and then compacting. That data shows that mixes having lubricating agents described herein may be successfully compacted at warm mix compaction temperatures regardless of whether the mixes are prepared using warm or hot mix preparation temperatures. In cases in which the mix does not include a lubricating agent and the mix is prepared using hot mix temperatures and compacted using warm mix temperatures, excessive air voids (e.g., an increase of at least 1-2 percentage points for in place voids) would be in the compacted paving material.

Example 2

A PG 70-28 polymer modified asphalt paving mix suitable for 10 million ESAL was produced with course mix aggregate at a mixing temperature of 157-163° C. When compacted at a standard compaction temperature between 140-146° C., the paving had unacceptably low and inconsistent field density values. When 0.3% phosphate ester was added to the paving mix, prepared at the above temperatures (157-163° C.), break-down rolled at normal compaction temp (140-146° C.), and densified at about 113° C., the field density values were at an acceptable level and also were more consistent.

Provided in Table 2 below are some exemplary preparation and compaction temperatures for a variety of asphalt grades having one or more of the lubricating agents described herein.

TABLE 2

| Asphalt Grade | Preparation temperature | Compaction temperature |
| --- | --- | --- |
| PG58-28 | 135-143° C. | 96-102° C. |
| PG64-22 | 146-163° C. | 135-152° C. |
| PG64-28 | 143-154° C. | 102-107° C. |
| PG76-22 | 160-177° C. | 146-163° C. |

The paving materials described herein may be prepared in any suitable commercial asphalt plant. Examples include a DOUBLE BARREL GREEN™ plant, a counter flow plant, a parallel flow plant, a remixer plant, a batch plant, and a double drum plant. The materials may be transported and applied using any suitable equipment.

The invention is not to be taken as limited to the details of the above description as modifications and variations may be made without departing from the spirit or scope of the invention.

The invention claimed is:

1. A bituminous paving process, which process comprises:
   a) mixing an asphalt binder, aggregate and 0.1-1.0 wt % lubricating additive based on the asphalt binder weight at a first temperature greater than 150° C. to form a bituminous mix consisting essentially of aggregate coated with asphalt binder and lubricating additive, wherein the lubricating additive comprises viscosity modifiers or dispersant viscosity modifiers selected from the group consisting of viscosity modifiers and dispersant viscosity modifiers used in engine lubricating oils, residual bottoms from refined recycled engine lubricating oils, extrusion processing aids, molding processing aids, polyolefins, ethylene vinyl acetates, acrylic polymers, silicones, elemental sulfur, and sulfur derivatives used in fuels to provide lubrication properties, and wherein a blend of the asphalt binder and lubricating additive has a measured maximum normal force no more than about 5.5 Newtons at 90° C. using a dynamic shear rheometer with a 50 μm gap, and
   b) compacting the bituminous mix at a second temperature less than 130° C. and at least about 55° C. below the first temperature to provide bituminous pavement having field density values of less than 10% in place air voids for the compacted bituminous mix.

2. The process of claim 1 wherein the viscosity modifiers or dispersant viscosity modifiers comprise polyisobutylenes, olefin copolymers, hydrogenated styrene-diene copolymers, styrene maleate copolymers, polymethacrylates, olefin-graft PMA polymers or hydrogenated polyisoprene star polymers.

3. The process of claim 1 wherein the viscosity modifiers or dispersant viscosity modifiers comprise ethylene vinyl acetates.

4. The process of claim 1 wherein the bituminous mix contains about 0.1-0.4 wt % lubricating additive based on the asphalt binder weight.

5. The process of claim 1 wherein the bituminous mix comprises about 1-98 wt % reclaimed asphalt pavement based on the bituminous mix weight.

6. The process of claim 1 wherein the bituminous mix comprises about 10-60 wt % reclaimed asphalt pavement based on the bituminous mix weight.

7. The process of claim 1 wherein the second temperature is less than about 125° C.

8. The process of claim 1 wherein the second temperature is less than 120° C.

9. The process of claim 1 wherein the second temperature is less than 100° C.

10. The process of claim 1 wherein the first temperature is greater than 160° C.

11. The process of claim 1 wherein the first temperature is greater than 170° C.

12. The process of claim 1 wherein a blend of the asphalt binder and lubricating additive has a measured maximum normal force no more than about 3 Newtons at 90° C. using a dynamic shear rheometer with a 50 μm gap.

13. The process of claim 1 wherein the field density values are less than 8% in place air voids.

14. The process of claim 1 wherein the field density values are less than 5% in place air voids.

15. The process of claim 1 comprising mixing an aqueous solution of the lubricating additive with the asphalt binder.

16. The process of claim 1 wherein the asphalt binder, aggregate and lubricating additive are essentially water free.

17. A bituminous paving process, which process comprises:
   a) mixing an asphalt binder, aggregate and 0.1-1.0 wt % lubricating additive based on the asphalt binder weight at a first temperature in a range of about 135-170° C. to form a bituminous mix consisting essentially of aggregate coated with asphalt binder and lubricating additive, wherein the lubricating additive comprises viscosity modifiers or dispersant viscosity modifiers selected from the group consisting of viscosity modifiers and dispersant viscosity modifiers used in engine lubricating oils, residual bottoms from refined recycled engine lubricating oils, extrusion processing aids, molding processing aids, polyolefins, ethylene vinyl acetates, acrylic polymers, silicones, elemental sulfur, and sulfur derivatives used in fuels to provide lubrication properties, wherein the asphalt binder, aggregate and lubricating additive are essentially water free, and wherein a blend of the asphalt binder and lubricating additive has a measured maximum normal force no more than about 5.5 Newtons at 90° C. using a dynamic shear rheometer with a 50 μm gap, and
   b) compacting the bituminous mix at a second temperature less than 130° C. and at least about 20° C. below the first temperature to provide bituminous pavement having field density values of less than 10% in place air voids for the compacted bituminous mix.

18. The process of claim 17 wherein the second temperature is more than 55° C. below the first temperature.

19. The process of claim 17 wherein the first temperature is greater than 150° C.

* * * * *